(12) United States Patent
Summerfield

(10) Patent No.: US 12,070,977 B2
(45) Date of Patent: Aug. 27, 2024

(54) TRAILER HITCH LOCK

(71) Applicant: Abram Summerfield, Orofino, ID (US)

(72) Inventor: Abram Summerfield, Orofino, ID (US)

(73) Assignee: SUM DESIGNS LLC, Orofino, ID (US)

( * ) Notice: Subject to any disclaimer, the term of this patent is extended or adjusted under 35 U.S.C. 154(b) by 234 days.

(21) Appl. No.: 17/861,101

(22) Filed: Jul. 8, 2022

(65) Prior Publication Data

US 2023/0010432 A1    Jan. 12, 2023

Related U.S. Application Data

(60) Provisional application No. 63/220,217, filed on Jul. 9, 2021.

(51) Int. Cl.
*B60D 1/60* (2006.01)
*B60R 25/01* (2013.01)

(52) U.S. Cl.
CPC ............... *B60D 1/60* (2013.01); *B60R 25/01* (2013.01)

(58) Field of Classification Search
CPC . B60D 1/00; B60D 1/60; B60D 1/605; B60D 1/58; B60D 1/583; B60R 1/003; B60R 2300/808; B60R 2021/0069
USPC ............................................................ 70/237
See application file for complete search history.

(56) References Cited

U.S. PATENT DOCUMENTS

| | | | | |
|---|---|---|---|---|
| 4,032,171 A * | 6/1977 | Allen | ....................... | B60D 1/28 |
| | | | | 280/507 |
| 6,666,051 B1 * | 12/2003 | Li | ........................ | B60R 25/001 |
| | | | | 70/38 A |
| 6,722,686 B2 | 4/2004 | Koy | | |
| 2014/0167391 A1 * | 6/2014 | Elliott | ..................... | B60D 1/06 |
| | | | | 280/507 |
| 2019/0168554 A1 * | 6/2019 | Reinken | .................. | B60D 1/28 |
| 2019/0193497 A1 * | 6/2019 | Williamson | ............. | B60D 1/60 |

* cited by examiner

*Primary Examiner* — Nathan Cumar
(74) *Attorney, Agent, or Firm* — Armstrong Teasdale LLP

(57) ABSTRACT

A security device for preventing unwanted attachment to a trailer coupler. The trailer hitch lock is formed by a lock body with notched arms and a lock bar that engages the notched arms of the lock body. The lock body engages the coupler mechanism of a trailer hitch and the lock bar secures the trailer hitch with a pad lock.

6 Claims, 2 Drawing Sheets

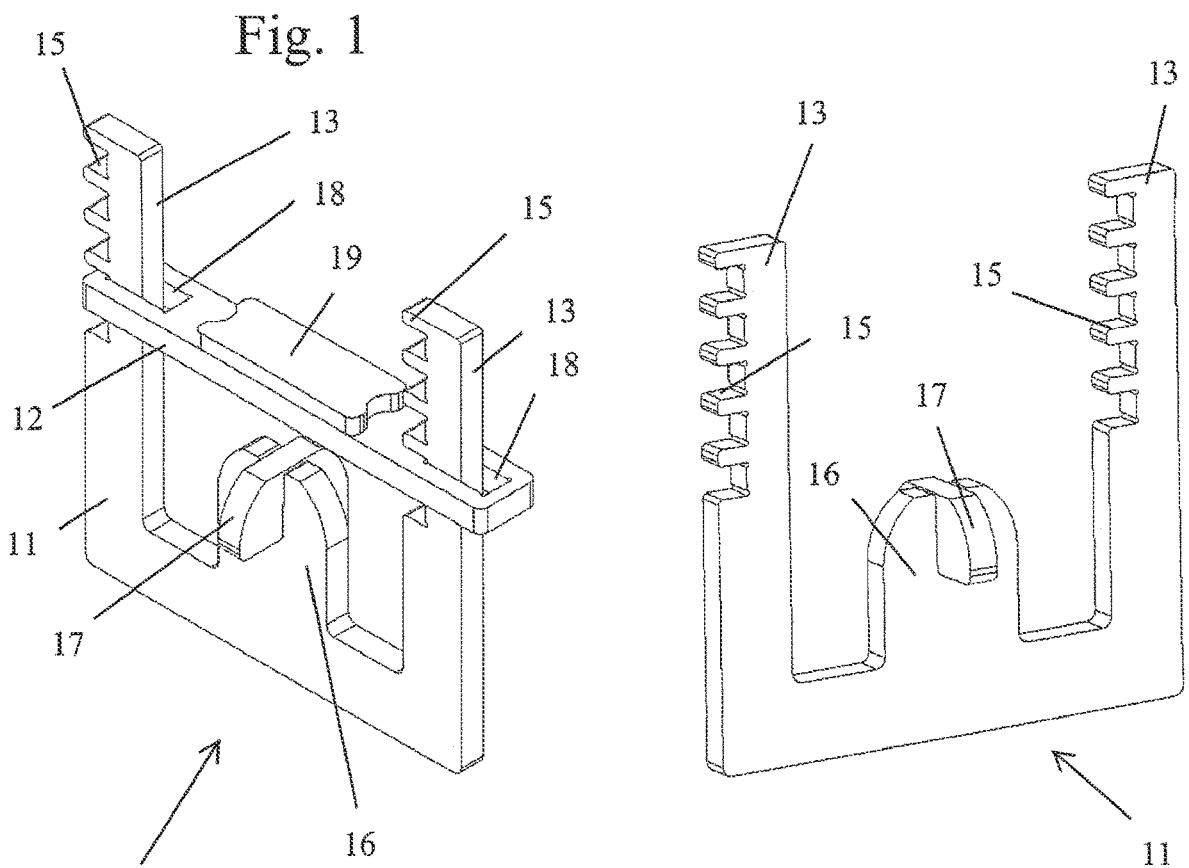
Fig. 1
Fig. 2
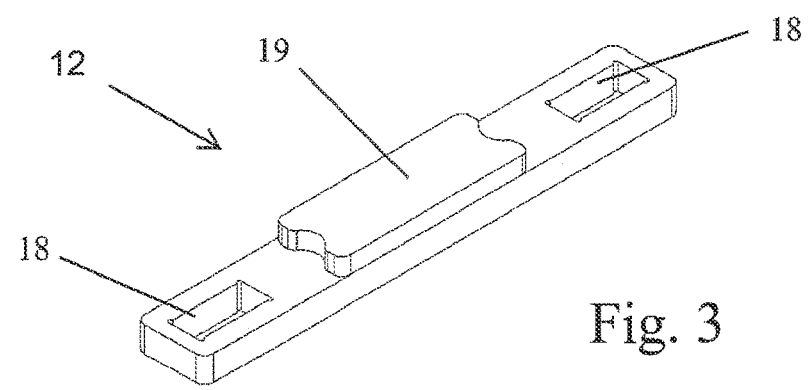
Fig. 3

TRAILER HITCH LOCK

CLAIM OF PRIORITY TO PROVISIONAL APPLICATION (35 U.S.C. § 119(e))

This application claims priority under 35 U.S.C. § 119(e) from provisional patent Application No. 63/220,217 filed on Jul. 9, 2021. The 63/220,217 application is incorporated herein by reference.

FIELD OF THE INVENTION

The present invention relates to trailer hitch locks.

BACKGROUND OF THE INVENTION

Hitch locking devices currently available, such as those sold by Curt (U.S. trademark Registration No. 3,153,311 of CURT MANUFACTURING, LLC), REESE, and Master Lock (U.S. trademark Registration No. 1,867,974 of Master Lock Company Corporation) are designed to use an internal locking mechanism to secure a pin or cross bar in place. Often these are simple locks that are easy to break or open with a pick or screw driver rendering the entire hitch lock device void. Commercially available hitch locks have a very poor reputation for being able to break or remove. They are typically made of cast aluminum and other inexpensive, weak materials. Their inferior design makes them unsuited for use on expensive trailers such as RVs, boat trailers, equipment trailers, etc.

U.S. Pat. No. 6,722,686 to Koy uses an internal locking mechanism (42), rather than an external padlock, to engage grooves (26) in a U-shaped shackle (12) that can be easily overcome with a hammer or pry bar.

The improved hitch lock disclosed here has been designed to provide superior security due to its unique Lock Bar design, ability to accept external pad locks, and steel construction.

SUMMARY OF THE INVENTION

The goal for the present invention was to create a more secure, modular hitch locking device that uses a robust lock bar design, and accepts external padlocks, while being stout and resistant to cutting, prying, or breaking.

The present hitch lock was engineered with several key objectives. One objective was to make the lock adjustable in nature to adapt to as many trailer coupler designs as possible. This includes ball couplers ranging in size from 1⅞" to 2 5/16" as well as pintle hitches, goose neck and 5$^{th}$ wheel adapters. The use of a Lock Bar and mating notches in the Lock Body achieve this goal by providing an adjustable interface that can adapt to a variety of hitch designs.

Another objective was to use an external lock, rather than an internal lock, ensuring that the lock mechanism is user selectable. The intent for the external lock was to provide the user the ability to select a lock of their choosing to satisfy their specific circumstances. For example, hardened disc style locks are available that resist cutting, prying, and picking. ABUS (U.S. trademark Registration No. 893,251 of ABUS August Bremicker Söhne KG Limited Partnership, Germany) is a preferred manufacturer of these pad locks. The disclosed invention is compatible with a multitude of pad locks including those manufactured by ABUS.

Additional objectives include using a material strong enough to withstand prying, hitting, and cutting. To achieve this, the use of AR500 steel was used. AR500 steel is often used for shooting targets, heavy equipment such as road graders, as well as body armor and armor plating for vehicles. Steel thickness of ¼" to ½" inch have proved adequate with ⅜" being the ideal thickness for many applications. This thickness of AR500 is very difficult to bend, cut, or break. Other materials that can be used for alternate embodiments include Lock Body and Lock Bar manufactured from O1 and D2 tool steels, A36, 4140, etc.

BRIEF DESCRIPTION OF THE DRAWINGS

FIG. 1 is a three-quarter perspective view of the trailer hitch lock assembly of the present invention.

FIG. 2 is a three-quarter perspective view of the lock body.

FIG. 3 is a three-quarter perspective view of the lock bar.

DETAILED DESCRIPTION OF THE INVENTION

Figure 4:
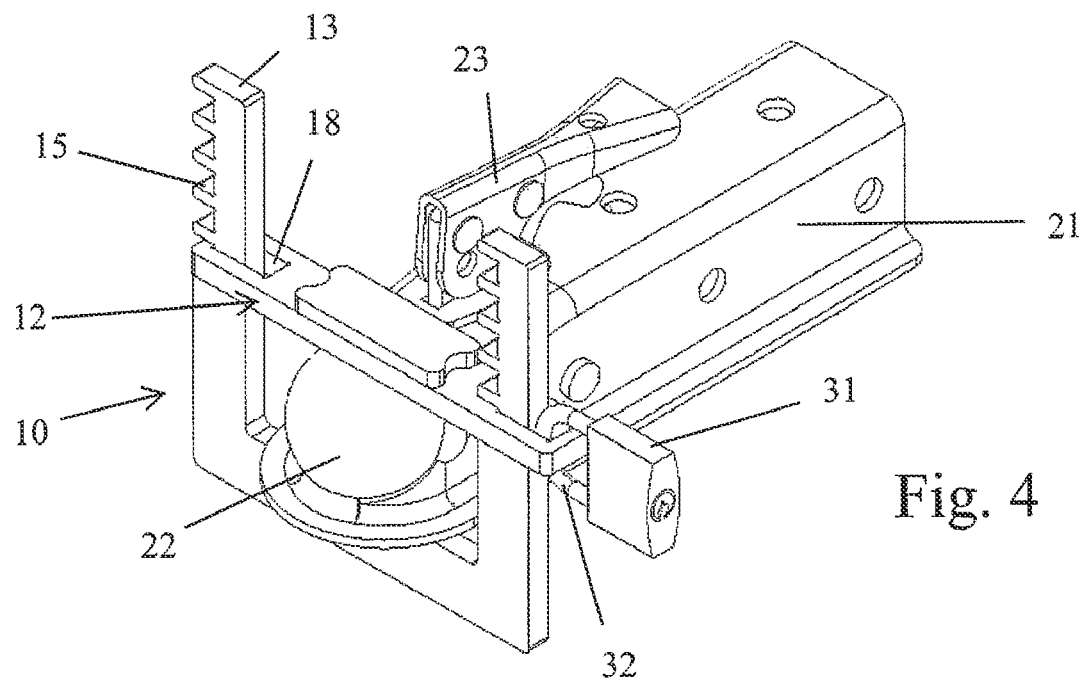
FIG. 4 is a three-quarter perspective view of the lock body assembly in position on a conventional trailer hitch coupler.

As shown in FIG. 1, the trailer hitch lock assembly 10 is formed by the lock body 11 and the lock bar 12. The lock body 11 is the lower portion shaped like an E. It has a semi-circular insert post 16 that creates a ball-like profile. This middle portion of the lock body 11 has a center post 16 that is inserted into the ball coupler 22 of a trailer hitch 21. The lock bar 12 is a horizontal bar having cutouts 18 at each end that engage notched slots 15 of the arms 13 of the lock body 11. The lock bar 12 is removable and can be positioned in any of the open slots formed by the notches 15 in the arms 13. Once the cutouts 18 are placed in position to engage the desired notched slots 15, the lock bar 12 is translated sideways to seat fully into the notched slots 15. Once seated, an external padlock 31 can be installed in the lock bar slot 18, outward of the lock body 11, as shown in FIGS. 4 and 5.

Referring to FIG. 2, the lock body 11 contains two arms 13 that have notched slots 15 that accept the cutouts 18 at the ends of the cross bar 12. The slots 15 and cutouts 18 are sized to ensure easy assembly and disassembly. The lock body 11 also has a center post 16 that is inserted into the ball socket 22 of the trailer hitch coupler 21 to occupy at least a cross-section of the trailer hitch socket 21. In an alternative embodiment there is a rounded blade 17 transversely installed into the center post 16 to create a three-dimensional ball like shape. In other embodiments, the center post 17 may be removed for use on 5$^{th}$ wheel or pintle hitch locks.

Referring to FIG. 3, the lock bar 12 has two cutouts 18 that accept the arms 13 of the lock body 11. The cross bar 12 is modular in nature, being able to rotate 180 degrees, and also be turned upside down. The raised portion 19 on the cross bar 12 provides extra adjustment to fit various trailer coupler designs, by flipping it upside down. The raised support 19 on the cross bar 12 may be welded in place. Other embodiments may not include this feature.

Figure 5:
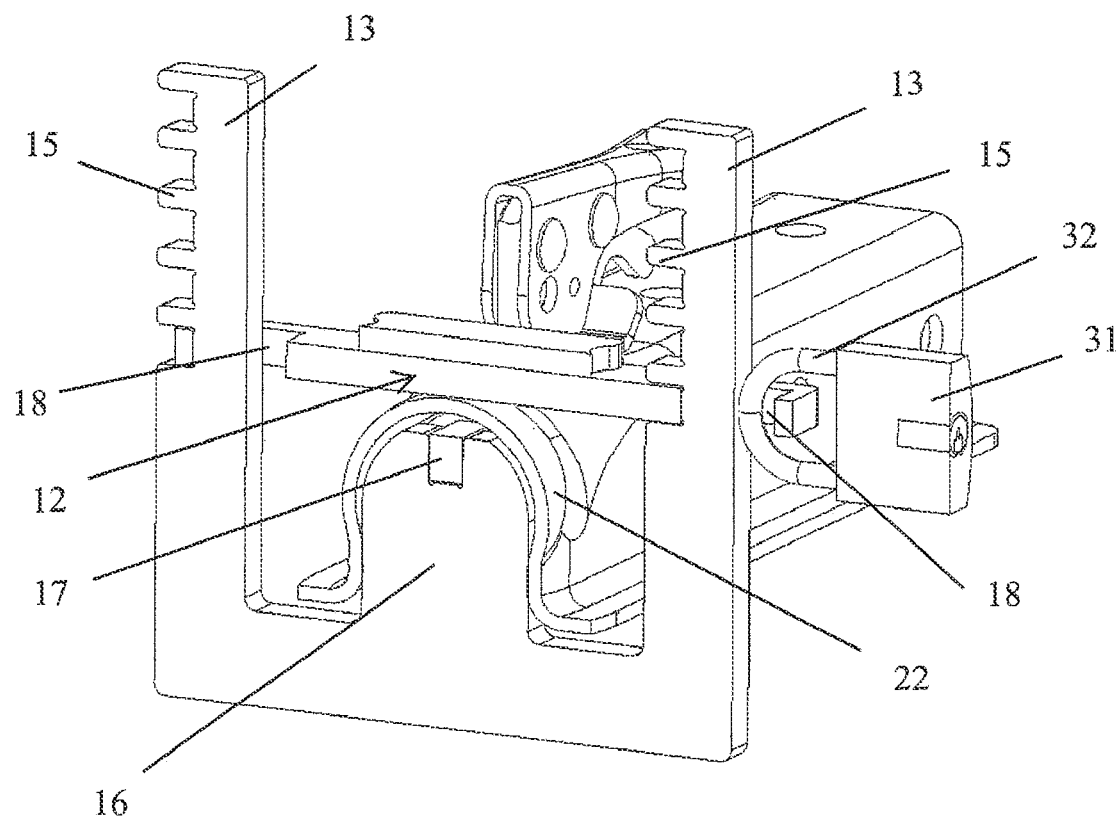
FIG. 5 is a three-quarter partial cut-away perspective view of the lock body assembly in position on a conventional trailer hitch coupler.

FIG. 4 shows the hitch lock 10 installed on trailer ball coupler 21. The cross bar 12 can be seen "locked" into the lowest slot 15, and the padlock 31 shackle 32 prevents the cross bar 12 from being removed.

FIG. 5 Shows hitch lock 10 installed in trailer ball socket 22. The cross bar 12 is secured in the lowest slot 15 and locked in place with a pad lock 31. The cross bar 12 secures the hitch lock base 11 into the ball socket 22 and prevents the assembly 10 from being removed.

The hitch lock device 10 is composed of two primary components, a lock body 11 that is ridged in nature, designed to fit into or around the trailer coupler. For ball couplers, the lock body 11 is able to be inserted into the ball socket 22 of trailers accepting ball sizes of 1⅞", 2, or 2 5/16". The lock body 11 contains one or more arms 13 that are notched 15 to accept the cutouts 18 of the mating lock bar 12. The lock body 11 may be constructed from a steel material. Testing has shown that ⅜" AR500 steel plate works very well for this component.

The lock bar 12 is a rigid body with one or more cutouts 18 that can be placed over the arms 13 of the lock body 11. The lock bar 12 can be configured to have a raised center portion 19, allowing for additional adjustment beyond the notch pattern 15 in the arms 13 of the lock body 11. The lock bar 12 may be constructed of a rigid steel material. Testing has shown that ⅜" AR500 steel is works very well for this application. In this embodiment, the lock bar 12 is nearly 7 inches in length, and 1 inch in width. The cutouts 18 in the lock bar 12 are designed to fit securely over the notched 15 arms 13 of the lock body 11, and also accept an external padlock 31. When positioned correctly in the ideal notch 15 of the lock body 11, the lock bar 12 cutouts 18 provide an exposed opening that will accept the shackle 32 of a pad lock 31. Testing has shown that padlocks with ⅜" shackle 32 perform well. For added security, the cutouts 18 in the crossbar 12 may be oversized to accept padlock 31 shackles 32 of 7/16" or larger.

The drawings and description set forth here represent only some embodiments of the invention. After considering these, skilled persons will understand that there are many ways to make a trailer hitch lock according to the principles disclosed. The inventor contemplates that the use of alternative structures, materials, or manufacturing techniques, which result in a trailer hitch lock according to the principles disclosed, will be within the scope of the invention.

The invention claimed is:

1. A trailer hitch lock, comprising:
    a lock body formed in a planar E-shape having a base with first and second ends and a middle portion, wherein a first arm projects up from the first end of the base, a second arm projects up from the second end of the base, and a center post projects up from the middle portion of the base, wherein the center post has a profile configured to occupy a cross-section of a trailer hitch ball socket, wherein the first and second arms further comprise inward edges facing each other and outward facing edges facing away from each other, and wherein a plurality of notches are formed in the inward facing edge of the first arm and complimentary notches are formed in the outward facing edge of the second arm;
    a lock bar having a first bar end and a second bar end opposite the first end and cutouts through the lock bar at the first and second bar ends, wherein the cutouts are spaced on the lock bar and sized to align with and fit around the arms of the lock body and engage one of the plurality of notches in the arms when the lock bar is moved in a first direction toward the inward facing edge of the first arm and disengage the notches when the lock bar is moved in a second direction toward the inward facing edge of the second arm; and
    a lock having a shackle sized to fit between the outward facing edge of the first arm and the cutout in the lock bar when the cutouts of the lock bar engage one of the plurality of the notches in the arms of the lock body, and wherein the shackle prevents the cutouts of the lock bar from being disengaged from the one of the plurality of notches in the arms of the lock body.

2. The trailer hitch lock of claim 1, further comprising a blade mounted transversely to the center post, wherein the blade is sized to occupy at least a portion of the trailer hitch ball socket.

3. The trailer hitch lock of claim 1, wherein the lock bar further comprises a top surface having a raised portion between the cutouts of the lock bar.

4. The trailer hitch lock of claim 1, wherein the lock body and lock bar are constructed of steel having a thickness of at least ⅜ inch.

5. The trailer hitch lock of claim 4, wherein the lock body and lock bar are constructed of hardened steel.

6. The trailer hitch lock of claim 5, wherein the hardened steel is AR500 steel.

* * * * *